(12) United States Patent
Yokoyama et al.

(10) Patent No.: US 11,634,064 B1
(45) Date of Patent: Apr. 25, 2023

(54) VEHICULAR LAMP FITTING AND RADAR STRUCTURE

(71) Applicant: Stanley Electric Co., Ltd., Tokyo (JP)

(72) Inventors: Taizo Yokoyama, Tokyo (JP); Takuya Matsumaru, London, OH (US); Keiichi Hirata, Tokyo (JP); Satoshi Ito, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/516,739

(22) Filed: Nov. 2, 2021

(51) Int. Cl.
*B60Q 1/00* (2006.01)
*G01S 13/931* (2020.01)
*G01S 7/02* (2006.01)

(52) U.S. Cl.
CPC ............ *B60Q 1/0023* (2013.01); *G01S 7/027* (2021.05); *G01S 13/931* (2013.01); *G01S 2013/93271* (2020.01); *G01S 2013/93277* (2020.01)

(58) Field of Classification Search
CPC ..... B60Q 1/0023; G01S 7/027; G01S 13/931; G01S 2013/93277; G01S 2013/93271
See application file for complete search history.

(56) References Cited

U.S. PATENT DOCUMENTS

2020/0039531 A1    2/2020  Fushimi et al.

FOREIGN PATENT DOCUMENTS

CN         112013351 A  * 12/2020  ........... B60Q 1/0023
WO       2018/173855 A1    9/2018

\* cited by examiner

*Primary Examiner* — Mary Ellen Bowman
(74) *Attorney, Agent, or Firm* — Xsensus LLP (57) ABSTRACT

A vehicular lamp fitting and the like in which a radar unit can be replaced without replacing the whole vehicular lamp fitting are provided. A vehicular lamp fitting includes a lamp housing, an outer lens attached to the lamp housing and forming a lamp chamber between the outer lens and the lamp housing, a lamp unit disposed in the lamp chamber, a bracket, and a radar unit detachably fixed to the bracket.

9 Claims, 9 Drawing Sheets

INNER SIDE IN VEHICLE-WIDTH DIRECTION ⟷ OUTER SIDE IN VEHICLE-WIDTH DIRECTION

VEHICULAR LAMP FITTING AND RADAR STRUCTURE

BACKGROUND

The present disclosure relates to a vehicular lamp fitting and a radar structure, and in particular to a vehicular lamp fitting and a radar structure in which a radar unit can be replaced without replacing the whole vehicular lamp fitting.

International Patent Publication No. WO2018/173855 (hereinafter also referred to as Patent Literature 1) discloses a vehicular lamp fitting including a lamp housing, an outer lens (optically-transparent member) attached to the lamp housing and forming a lamp chamber between the outer lens and the lamp housing, a lamp unit, and a radar unit (a radar apparatus), in which the lamp unit and the radar unit are disposed in the lamp chamber (see, in particular, FIG. 2 of Patent Literature 1). The radar unit is used for detecting an object by transmitting a high-frequency electromagnetic wave (e.g., millimeter wave) around a vehicle and receiving a reflected wave from the object existing within a transmission range of the electromagnetic wave.

SUMMARY

However, in the vehicular lamp fitting disclosed in Patent Literature 1, maintenance (a repair or replacement) of the radar unit is not taken into consideration, and therefore there is a problem that when a failure occurs in the laser unit and it needs to be replaced, the whole vehicular lamp fitting has to be replaced.

The present disclosure has been made in order to solve the above-described problem, and an object thereof is to provide a vehicular lamp fitting and a radar structure in which a radar unit can be replaced without replacing the whole vehicular lamp fitting.

A vehicular lamp fitting according to an aspect includes: a lamp housing; an outer lens attached to the lamp housing and forming a lamp chamber between the outer lens and the lamp housing; a lamp unit disposed in the lamp chamber; a bracket; and a radar unit detachably fixed to the bracket, in which a through hole connected to the lamp chamber is formed in the lamp housing, the bracket includes a first part and a second part, the first part being configured to be disposed in the lamp chamber through the through hole, and the second part being configured to close the through hole in a state where the first part is disposed in the lamp chamber, the vehicular lamp fitting further includes a fixing part configured to detachably fix the bracket to the lamp housing in a state in which the first part is disposed in the lamp chamber and the second part closes the through hole, and the radar unit is disposed in the lamp chamber while being detachably fixed to the first part.

By the above-described configuration, the radar unit can be replaced without replacing the whole vehicular lamp fitting.

This is because the radar unit is detachably fixed to the bracket, which is detachably fixed to the lamp housing in the state in which the first part is disposed in the lamp chamber and the second part closes the through hole formed in the lamp housing.

Further, in the above-described vehicular lamp fitting, the first part may extend to a vicinity of the outer lens, and the radar unit may be detachably fixed to a tip of the first part.

Further, in the above-described vehicular lamp fitting, the through hole may be a through hole connecting a rear surface of the lamp housing to the lamp chamber, or a through hole connecting a lower surface of the lamp housing to the lamp chamber.

Further, in the above-described vehicular lamp fitting, the through hole may be a through hole having a polygonal outer shape, and a cross-sectional shape of the bracket may be a polygonal shape conforming to that of the through hole.

Further, in the above-described vehicular lamp fitting, in one of the first part and the lamp housing, a positioning rib configured to abut against the other of the first part and the lamp housing may be provided.

Further, in the above-described vehicular lamp fitting, a vertical wall (standing wall) part surrounding the through hole may be formed in the lamp housing.

Further, in the above-described vehicular lamp fitting, a cut-out part surrounded by side surfaces of a closure part and an extension part may be formed in the bracket, and a connector detachably fixed to a radar-unit holding part may be disposed in the cut-out part.

Further, in the above-described vehicular lamp fitting, a through hole through which a cable extending from the connector is drawn to the outside of the lamp chamber may be formed in the closure part.

A radar structure according to another aspect includes: a bracket including a first part and a second part, the first part being configured to be disposed in a lamp chamber through a through hole formed in a lamp housing, the lamp chamber being formed by the lamp housing and an outer lens attached to the lamp housing, the second part being configured to close the through hole in a state where the first part is disposed in the lamp chamber, and the bracket being configured to be detachably fixed to the lamp housing in a state in which the first part is disposed in the lamp chamber and the second part closes the through hole; and a radar unit disposed in the lamp chamber while being detachably fixed to the bracket.

According to the present disclosure, it is possible to provide a vehicular lamp fitting and a radar structure in which a radar unit can be replaced without replacing the whole vehicular lamp fitting.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

A vehicular lamp fitting 10, which is an embodiment according to the present disclosure, will be described hereinafter with reference to the attached drawings. The same reference numerals (or symbols) are attached to corresponding components throughout the drawings, and redundant explanations thereof are omitted as appropriate.

Figure 1:
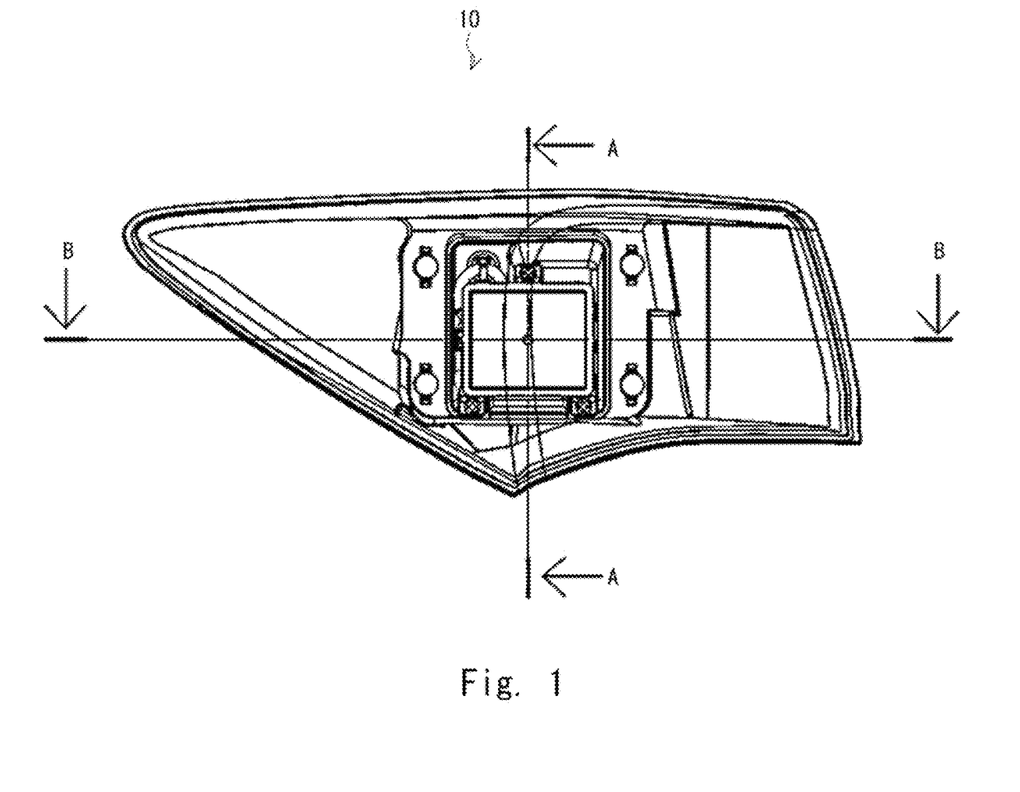
FIG. 1 is a front view of a vehicular lamp fitting 10.

FIG. 1 is a front view of the vehicular lamp fitting 10.

The vehicular lamp fitting 10 according to this embodiment is a signal lamp for a vehicle that functions as a rear combination lamp, and is mounted on each of the left and right sides of the rear end of a vehicle such as an automobile (not shown). Since the vehicular lamp fittings 10 mounted on both the left and right sides of the rear end of the vehicle are symmetrical to each other, only the vehicular lamp fitting 10 mounted on the left side (the left side when facing the front side of the vehicle) of the rear end of the vehicle will be described hereinafter as a representative example.

Figure 2:
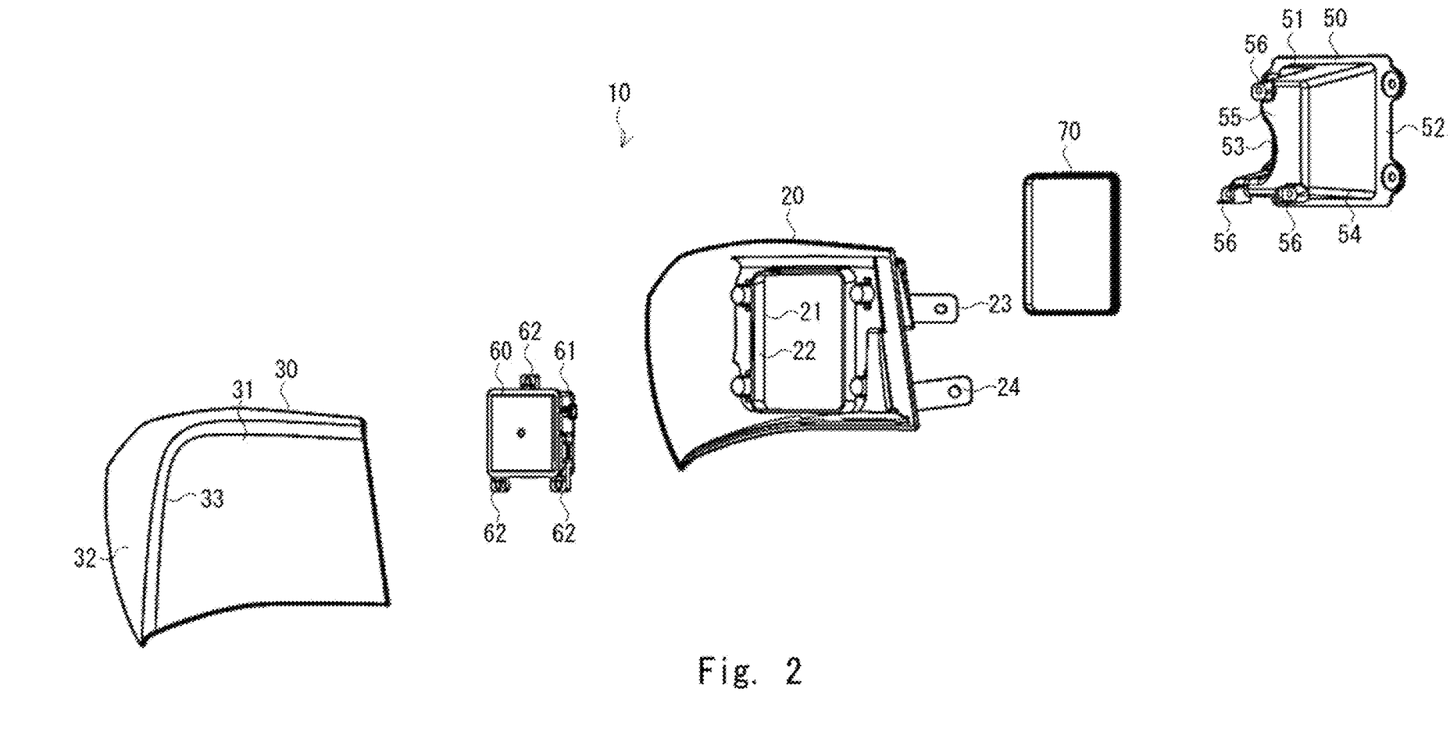
FIG. 2 is an exploded perspective view of the vehicular lamp fitting 10.
Figure 3:
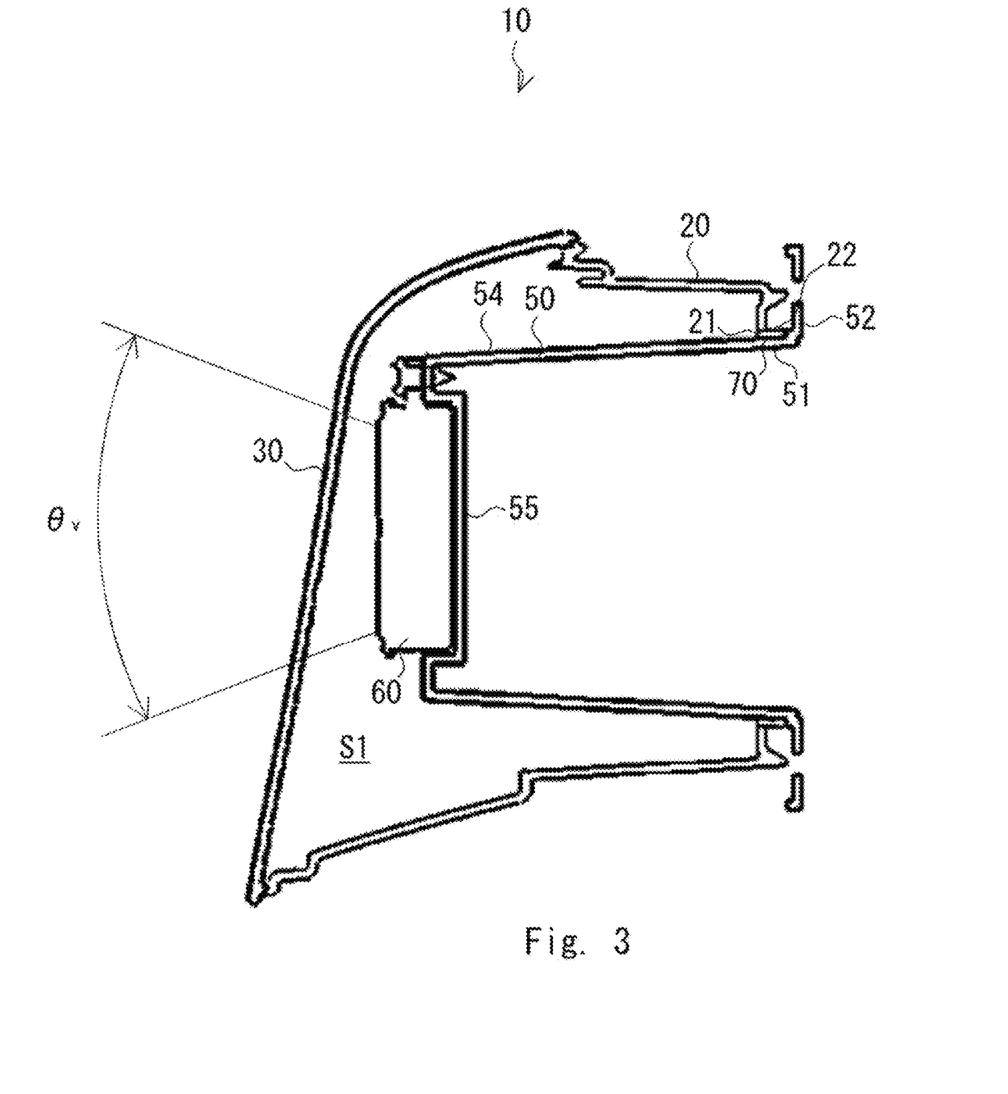
FIG. 3 is a cross-sectional view taken along a line A-A in FIG. 1.
Figure 4:
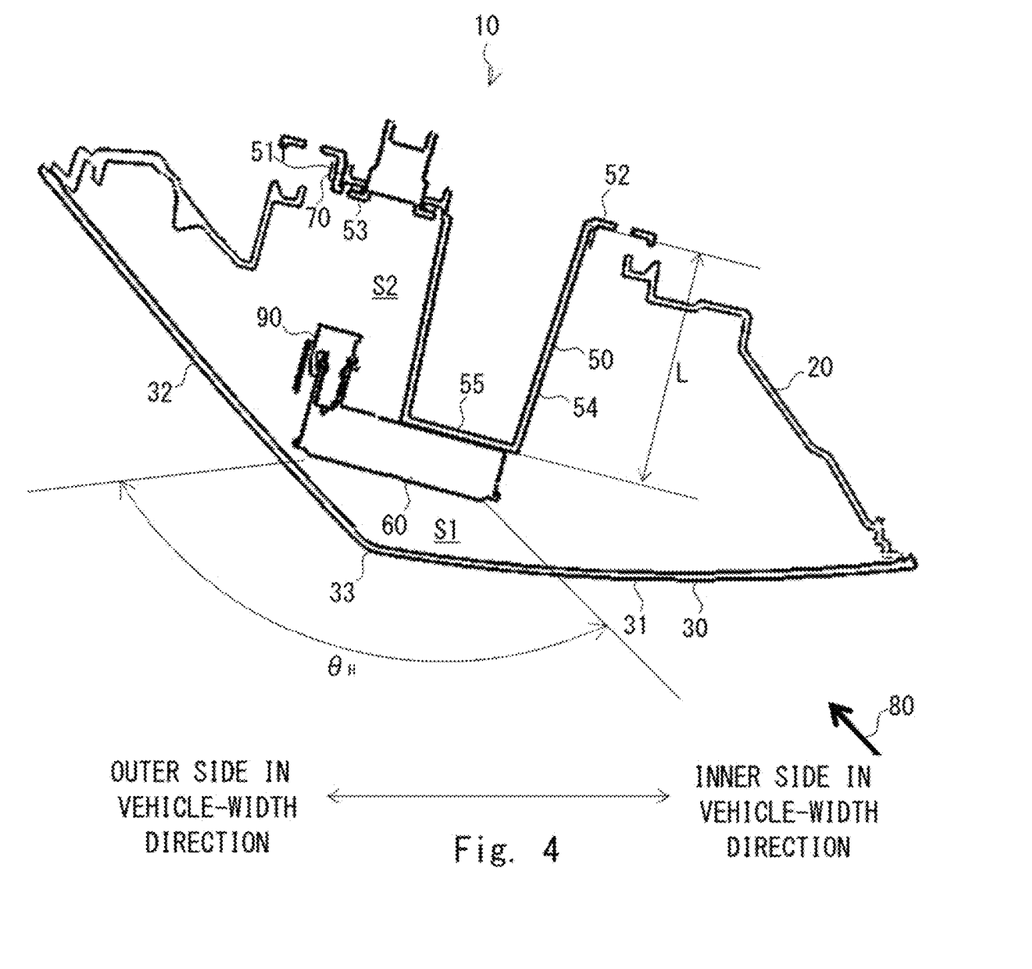
FIG. 4 is a cross-sectional view taken along a line B-B in FIG. 1.

FIG. 2 is an exploded perspective view of the vehicular lamp fitting 10. FIG. 3 is a cross-sectional view taken along a line A-A in FIG. 1. FIG. 4 is a cross-sectional view taken along a line B-B in FIG. 1.

As shown in FIG. 2, the vehicular lamp fitting 10 includes a lamp housing 20, an outer lens 30, lamp units 40 (40A to 40C, not shown in FIG. 2, see FIG. 5), a bracket 50, a radar unit 60, and a gasket 70.

The outer lens 30 is made of a material that is transparent to light (visible light) emitted by the lamp unit 40, and, for example, made of a transparent resin (a synthetic resin) such as acrylic and polycarbonate. The outer lens 30 is attached to the lamp housing 20 in a state in which it covers the opening of the lamp housing 20, and forms a lamp chamber S1 between the outer lens 30 and the lamp housing 20 (see FIGS. 3 and 4). The outer lens 30 is welded to the lamp housing 20 (the opening end) along its whole peripheral edge.

Figure 5:
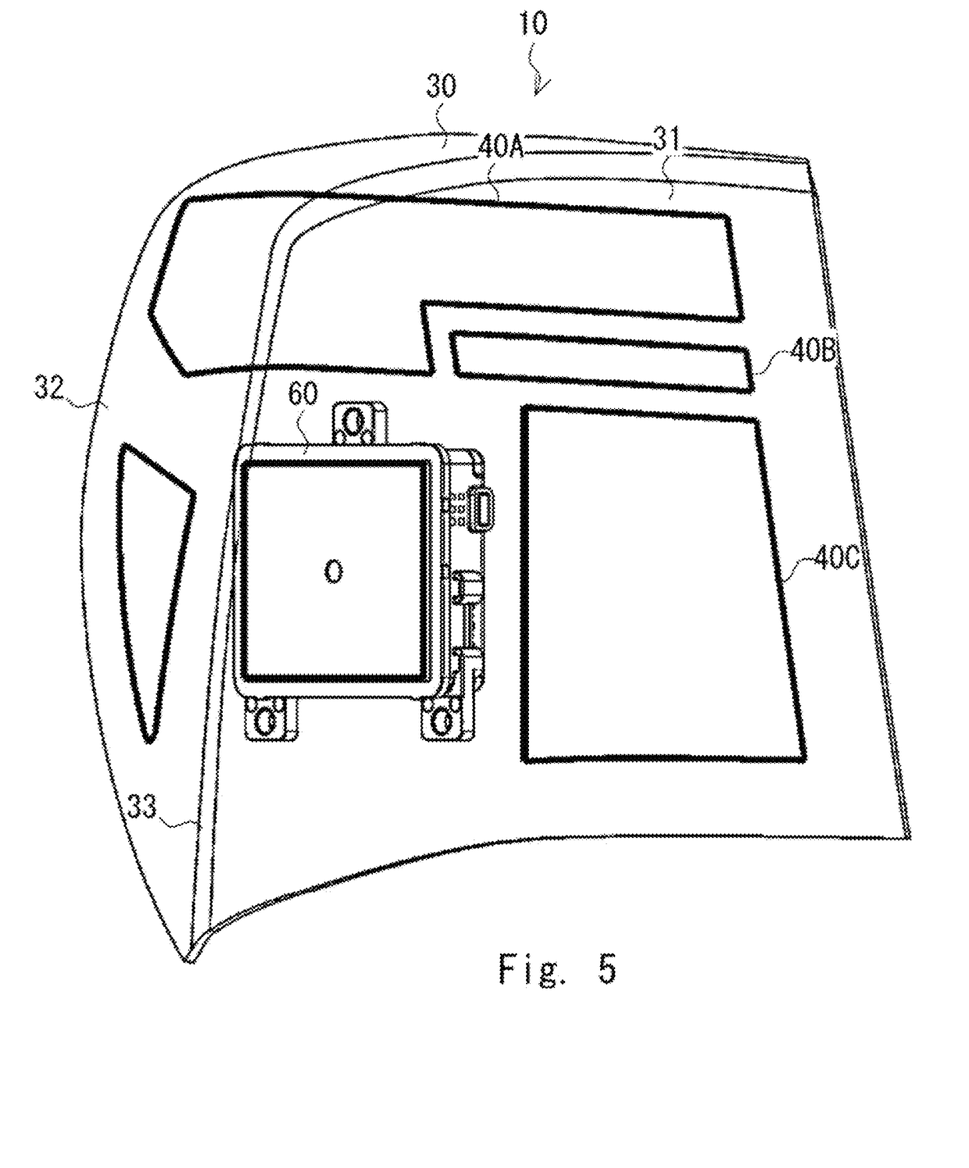
FIG. 5 is a view as seen in a direction indicated by an arrow 80 in FIG. 4.

The lamp housing 20 is made of a synthetic resin such as acrylic and polycarbonate, and a through hole 21 connecting (i.e., extending) to the lamp chamber S1 is formed in the lamp housing 20 (see FIGS. 2, 3 and 5). The through hole 21 is a through hole having a rectangular outer shape. The through hole 21 connects the rear surface of the lamp housing 20 to the lamp chamber S1 (i.e., extends from the rear surface of the lamp housing 20 to the lamp chamber S1). A rectangular ring-shaped vertical wall part (e.g., a perpendicular wall part) 22 surrounding the through hole 21 (see FIG. 2) is provided on the front side of the lamp housing 20.

As shown in FIG. 4, the outer lens 30 includes a rear lens part 31 disposed on the rear end side of the vehicle and a side lens part 32 disposed on the lateral side of the vehicle. The rear lens part 31 and the side lens part 32 are continuous through a curved part 33. Note that the outer lens 30 may have an arbitrary shape as desired according to the design of the vehicle or the like.

FIG. 5 is a perspective view as seen in a direction indicated by an arrow 80 in FIG. 4. FIG. 5 shows an example of the arrangement of the lamp units 40 (40A to 40C) and the radar unit 60. Note that the number and the arrangement of the lamp units 40 are not limited to the example shown in FIG. 5, and they may be determined as appropriate.

The lamp units 40 (40A to 40C) are disposed in the lamp chamber S1, which is formed by the outer lens 30 and the lamp housing 20.

The lamp unit 40A is, for example, a lamp unit for both a stop lamp and a tail lamp, and includes a reflector(s) (a reflective surface(s)) for both the stop lamp and the tail lamp (not shown), and a light source(s) for both the stop lamp and the tail lamp (not shown). When the light source for both the stop lamp and the tail lamp is turned on, light emitted from the light source for both the stop lamp and the tail lamp is reflected by the reflector (the reflective surface) for both the stop lamp and the tail lamp, passes through the outer lens 30, and is emitted to the outside. In this way, the stop lamp or the tail ramp is implemented.

The lamp unit 40B is, for example, a lamp unit for a stop lamp, and includes a reflector (a reflective surface) for the stop lamp and a light source for the stop lamp (not shown). When the light source for the stop lamp is turned on, light emitted by the light source for the stop lamp is reflected by the reflector (the reflective surface) for the stop lamp, passes through the outer lens 30, and is emitted to the outside. In this way, the stop lamp is implemented.

The lamp unit 40C is, for example, a lamp unit for a turn lamp (i.e., a blinker), and includes a reflector (a reflective surface) for the turn lamp and a light source for the turn lamp (not shown). When the light source for the turn lamp is turned on, light emitted by the light source for the turn lamp is reflected by the reflector (the reflective surface) for the turn lamp, passes through the outer lens 30, and is emitted to the outside. In this way, the turn lamp is implemented.

Figure 6:
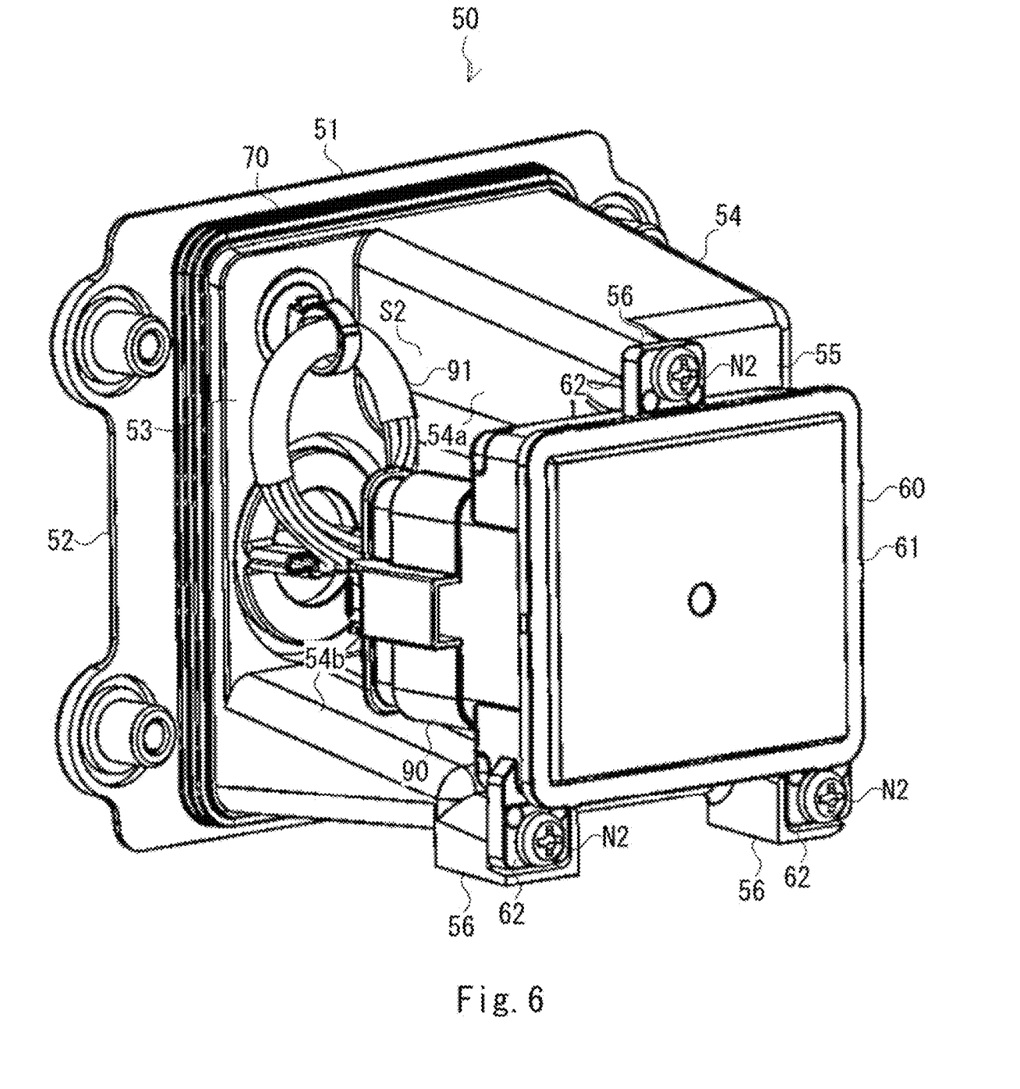
FIG. 6 is a perspective view of a bracket 50.

FIG. 6 is a perspective view of the bracket 50.

The bracket 50 is made of a synthetic resin such as acrylic and polycarbonate, and as shown in FIGS. 2 and 6, includes a rectangular ring-shaped part 51, a flange part 52 provided in the rectangular ring-shaped part 51, a closure part 53 that closes (i.e., covers) a part of the rectangular ring-shaped part 51, an extension part 54 that extends to the vicinity of the outer lens 30, and a radar-unit holding part 55 disposed at the tip of the extension part 54.

As shown in FIG. 6, in the bracket 50, a space S2 (a cut-out part, see FIG. 4) surrounded by the closure part 53 and side surfaces 54a and 54b of the extension part 54 is formed. In this space S2, a connector 90 detachably fixed to the radar-unit holding part 55 (or detachably fixed to the radar unit 60, which is detachably fixed to the radar-unit holding part 55) is disposed.

The cross-sectional shape of the bracket 50 (the rectangular ring-shaped part 51) is a rectangular shape conforming to that of the through hole 21 (the vertical wall part 22) formed in the lamp housing 20. A gasket 70 is provided in the rectangular ring-shaped part 51 (see FIG. 6).

The flange part 52 is provided along the whole peripheral edge of the rectangular ring-shaped part 51. The rectangular ring-shaped part 51 and the flange part 52 are an example of the second part in the present disclosure.

The closure part 53 closes (i.e., covers) a part of the rectangular ring-shaped part 51, i.e., a part of the rectangular ring-shaped part 51 other than the extension part 54. A through hole for pulling out a cable(s) 91 (a power supply cable and the like) to the outside of the lamp chamber S1 is formed in the closure part 53. The cable(s) 91 extends from the connector 90. The cable(s) 91 supplies power and sends and receives various signals.

The extension part 54 is formed in a cylindrical shape by extending the edge portion surrounded by the rectangular ring-shaped part 51 and the closure part 53 to the vicinity of the outer lens 30. The tip of the extension part 54 is closed (i.e., covered) by the radar-unit holding part 55. The extension part 54 is an example of the first part in the present disclosure.

The length L (see FIG. 4) of the extension part 54 is a length considered so that an electromagnetic wave (millimeter wave) transmitted from the radar unit 60 fixed to the tip part (radar unit holding part 55) does not interfere with the surrounding structure (For example, lamp units 40 (40 A to 40 C)). The transmission range of the electromagnetic wave (millimeter wave) transmitted from the radar unit 60 is a range of a vertical spreading angle $\theta_V$ (see FIG. 3) and a horizontal spreading angle $\theta_H$ (see FIG. 4).

In the radar-unit holding part 55, screw bosses 56 (disposed at three places in FIGS. 2 and 6), to which flange parts 62 (disposed at three places in FIGS. 2 and 6) provided in the radar unit 60 (the case 61) are fixed by screws, are provided. The screw bosses 56 are disposed at the places (three places in FIGS. 2 and 6) corresponding to the flange parts 62 (three places in FIGS. 2 and 6).

Figure 7:
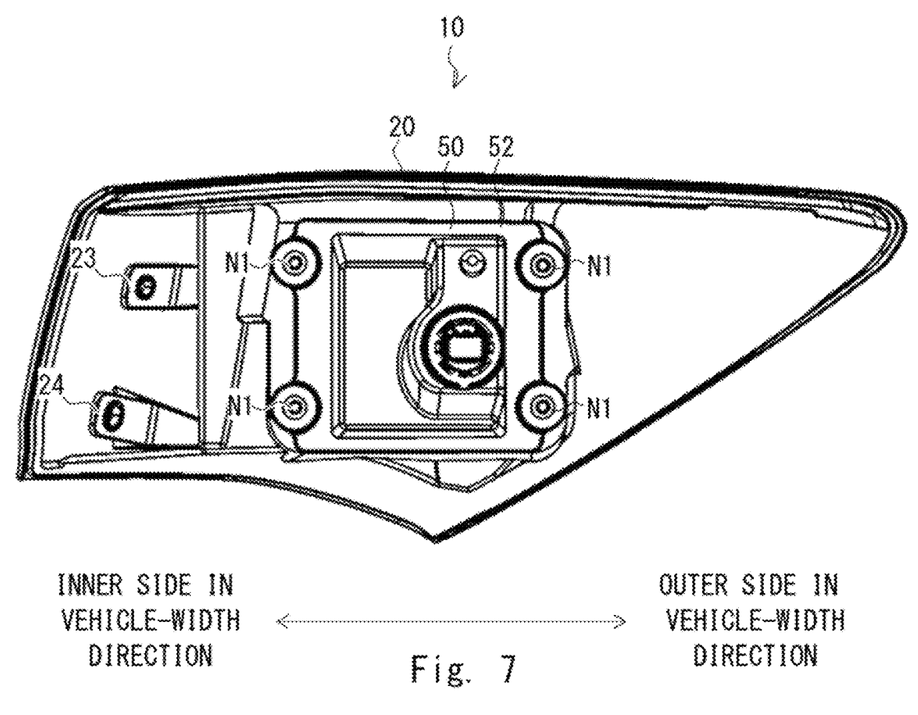
FIG. 7 is a rear view of a lamp housing 20 to which the bracket 50 is fixed.

FIG. 7 shows a rear view of the lamp housing 20 to which the bracket 50 is fixed.

As shown in FIG. 7, the bracket 50 is detachably fixed to the lamp housing 20. Specifically, as shown in FIGS. 3 and 4, the bracket 50 is detachably fixed to the lamp housing 20 by fixing the flange part 52 to the lamp housing part around the through hole 21 by screws N1 (four places in FIG. 7) in a state in which the extension part 54 has been disposed in the lamp chamber S1 through the through hole 21 and the flange part 52 abuts against (i.e., is in contact with) the lamp housing part around the through hole 21 (see FIG. 7). The screws N1 are an example of the fixing part in the present disclosure.

As described above, as shown in FIG. 3, the rectangular ring-shaped part 51 has been inserted into the through hole 21 (the rectangular ring-shaped vertical wall part 22 surrounding the through hole 21) in the state in which the bracket 50 is detachably fixed to the lamp housing 20, and the rectangular ring-shaped part 51 inserted into the through hole 21 and the rectangular ring-shaped vertical wall part 22 surrounding the through hole 21 are opposed to each other. Further, the gasket 70 is disposed between these rectangular ring-shaped part 51 and the vertical wall part 22 opposed to each other. In this way, the lamp chamber S1 is kept in a hermetically closed state.

As shown in FIG. 2, the radar unit 60 (the radar apparatus) includes the case 61, a transmitting antenna and a receiving antenna (both of which are not shown) housed in the case 61, and so on. The radar unit 60 is a millimeter-wave radar unit that transmits electromagnetic waves (millimeter waves) from the transmitting antenna. The electromagnetic waves (the millimeter waves) pass through the outer lens 30 and are transmitted (emitted) to a range having a vertical divergence angle $\theta_V$ (see FIG. 3) and a horizontal divergence angle $\theta_H$ (see FIG. 4). Further, the radar unit 60 receives, by the receiving antenna, reflected waves which have been reflected by an object present in the aforementioned transmission range (the emission range) and have passed through the outer lens 30. The received signal is processed by a control apparatus such as an ECU (Electronic Control Unit) (not shown), so that the object (e.g., a distance, an angle, and a velocity of the object) is detected. In the radar unit 60, for example, millimeter waves in a frequency band of 76 to 81 GHz, in particular, in a frequency band of 79 GHz, are used. However, the frequency band is not limited to these frequency bands.

Note that the radar method of the radar unit 60 may be either of a pulse method or a CW (Continuous Wave) method, or may be any other method. Further, the antenna method of the radar unit 60 may be any of a mechanical scanning method, a beam switching method, a phased array method, and a digital forming method, or may be any other method.

The radar unit 60 is detachably fixed to the bracket 50. Specifically, as shown in FIG. 6, the radar unit 60 is detachably fixed to the bracket 50 (the radar-unit holding part 55) by fixing the flange parts 62 (three places in FIG. 6) provided in the case 61 to the screw bosses 56 (three places in FIG. 6) provided in the bracket 50 by screws N2 (three places in FIG. 6).

The vehicular lamp fitting 10 having the above-described configuration is mounted on a vehicle by fixing flange parts 23 and 24 (see FIG. 2) provided in the lamp housing 20 to the vehicle (e.g., the frame of the vehicle body or the bumper) by screws.

Next, a procedure for detachably fixing the bracket 50, to which the radar unit 60 has been detachably fixed as described above, to the lamp housing 20 will be described.

Firstly, the extension part 54 of the bracket 50 is disposed in the lamp chamber S1 through the through hole 21 formed in the lamp housing 20, and the flange parts 52 of the bracket 50 are brought into contact with the lamp housing part around the through hole 21 formed in the lamp housing 20. Next, in this state, the flange part 52 is fixed to the lamp housing part around the through hole 21 by screws N1 (four places in FIG. 7). At this time, the rectangular ring-shaped part 51 is inserted into the through hole 21 (a rectangular ring-shaped vertical wall part 22 surrounding the through hole 21), and the rectangular ring-shaped part 51 inserted into the through hole 21 and the rectangular ring-shaped vertical wall part 22 surrounding the through hole 21 are opposed to each other.

As a result, the bracket 50 (and the radar unit 60 fixed thereto) is positioned relative to the lamp housing 20 (and the outer lens 30) in the up/down and left/right directions. Further, since the flange part 52 of the bracket 50 abuts against (i.e., is in contact with) the lamp housing part around the through hole 21 formed in the lamp housing 20, the bracket 50 (and the radar unit 60 fixed thereto) is positioned relative to the lamp housing 20 (and the outer lens 30) in the depth direction.

By positioning the bracket 50 (and the radar unit 60 fixed thereto) relative to the lamp housing 20 (and the outer lens 30) as described above, the accuracy of the attachment of the radar unit 60 is improved.

Further, the gasket 70 is disposed between the rectangular ring-shaped part 51 and the vertical wall part 22, which are opposed to each other, as described above. As a result, the lamp chamber S1 in kept in a hermetically closed state.

Next, a procedure for replacing the radar unit 60 will be described.

Firstly, the screws N1 (see FIG. 7) are removed (i.e., unscrewed) and the bracket 50 is removed from the lamp housing 20. As a result, the radar unit 60 is exposed. Next, the radar unit 60 is removed from the bracket 50 and replaced by another radar unit 60. When doing so, since the radar unit 60 is detachably fixed to the bracket 50 (the radar-unit holding part 55) by the screws N2 (see FIG. 6), the radar unit 60 can be easily replaced by another radar unit 60.

As explained above, according to this embodiment, the radar unit 60 can be replaced without replacing the whole vehicular lamp fitting 10.

This is because the radar unit 60 is detachably fixed to the bracket 50 (radar-unit holding part 55). The bracket 50 is detachably fixed to the lamp housing 20 in a state that the extension part 54 is arranged in the lamp chamber S1 and the rectangular ring-shaped part 51 and the flange part 52 close a through hole 21 formed in the lamp housing 20.

Further, according to this embodiment, the bracket 50 to which the radar unit 60 is detachably fixed can be attached to the lamp chamber S1 from the rear side of the lamp housing 20. Further, according to this embodiment, since the radar unit 60 can be replaced by removing the bracket 50 to which the radar unit 60 is detachably fixed from the rear side of the lamp housing 20, maintenance at the time of failure of the radar unit 60 can be performed.

Next, a modified example will be described.

Figure 8:
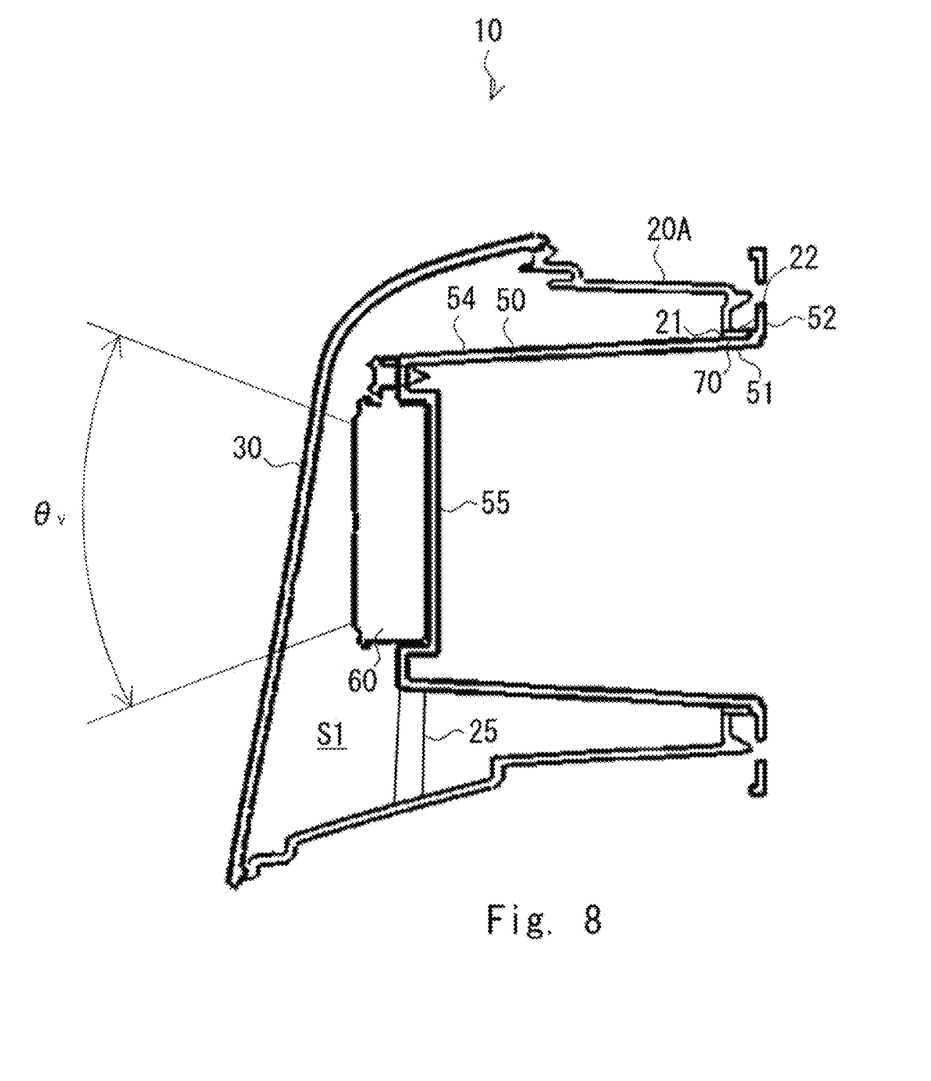
FIG. 8 shows a modified example of the vehicular lamp fitting 10.

FIG. 8 shows a modified example of the vehicular lamp fitting 10.

As shown in FIG. 8, a positioning rib 25, which abuts against the tip (the bottom part) of the extension part 54 of the bracket 50, is provided in a lamp housing 20A according to this modified example. The rest of the structure is similar to that of the vehicular lamp fitting 10 according to the above-described embodiment (see FIG. 3).

According to this modified example, since the tip (the bottom part) of the extension part 54 of the bracket 50 is supported in the positioned state by the positioning rib 25, it is possible to prevent (or suppress) the tip of the extension part 54 of the bracket 50 (i.e., the radar unit 60 fixed to the tip of the extension part 54) from being displaced due to its own weight. In this way, it is possible to prevent (or suppress) the radar unit 60 from being displaced due to its own weight and thereby to prevent (or suppress) the detection area of the radar unit 60 from being significantly changed.

Further, according to this modified example, the tip (the bottom part) of the extension part 54 of the bracket 50 is supported in the positioned state by the positioning rib 25. Therefore, even if the vehicle (not shown) on which the vehicular lamp fitting 10 is mounted vibrates (For example, vibration during driving), it is possible to prevent (or suppress) the tip end portion of the extension part 54 of the bracket 50 (the radar unit 60 fixed to the tip end portion) from vibrating to largely fluctuate the detection area of the radar unit 60.

Figure 9A:
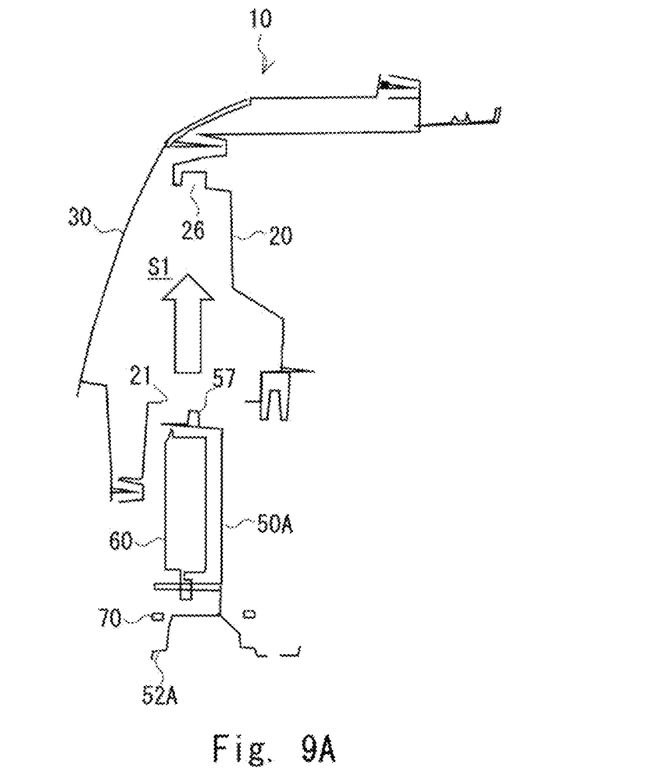
FIG. 9A shows a modified example of the vehicular lamp fitting 10.
Figure 9B:
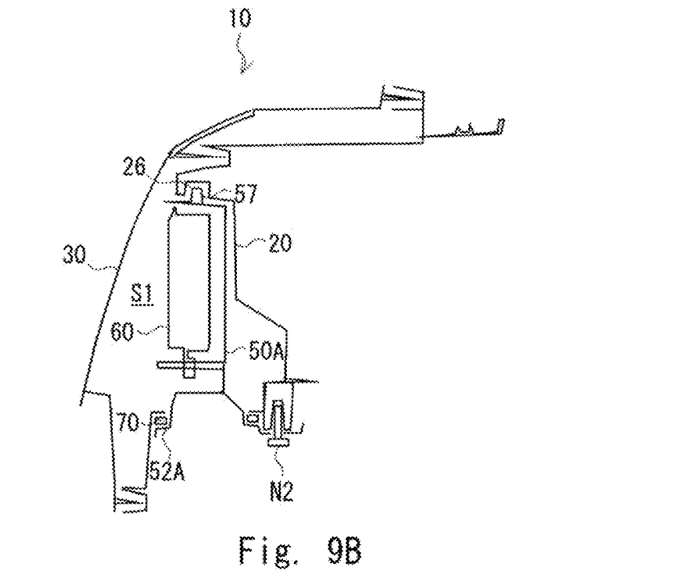
FIG. 9B shows a modified example of the vehicular lamp fitting 10.

FIG. 9 is another modified example of the vehicular lamp fitting 10. This vehicular lamp fitting 10 according to this modified example will be referred to as a vehicular lamp fitting 10A hereinafter.

In the above-described embodiment, an example in which the through hole 21 formed in the lamp housing 20 is a through hole that connects the rear surface of the lamp housing 20 to the lamp chamber S1 (i.e., extends from the rear surface of the lamp housing 20 to the lamp chamber S1) was described. However, the present disclosure is not limited to this example. For example, as shown in FIG. 9, the through hole 21 formed in the lamp housing 20 may be a through hole that connects the lower surface of the lamp housing 20 to the lamp chamber S1 (i.e., extends from the lower surface of the lamp housing 20 to the lamp chamber S1).

In this modified example, the bracket 50A, to which the radar unit 60 is detachably fixed, is inserted into the lamp chamber S1 through the through hole 21 formed in the lamp housing 20 (see an arrow in FIG. 9A), and is detachably fixed to the lamp housing 20 by screws N2 in a state in which the flange part 52A of the bracket 50A and the lamp housing part around the through hole 21 formed in the lamp housing 20 are opposed to each other with the gasket 70 interposed therebetween (see FIG. 9B).

When doing so, as shown in FIG. 9B, a positioning rib 57 provided in the upper part of the bracket 50A is inserted into a positioning recess 26 provided in the lamp housing 20. In this way, the radar unit 60 is positioned relative to the outer lens 30. Note that the positioning rib 57 may be provided in the lamp housing 20 and the positioning recess 26 may be provided in the bracket 50A.

According to this modified example, the bracket 50 to which the radar unit 60 is detachably fixed can be attached to the lamp chamber S1 from the underside of the lamp housing 20. Further, according to this embodiment, since the radar unit 60 can be replaced by removing the bracket 50 to which the radar unit 60 is detachably fixed from the underside of the lamp housing 20, maintenance at the time of failure of the radar unit 60 can be performed.

Note that although it is not shown in the drawings, the through hole 21 formed in the lamp housing 20 may be a through hole that connects a surface of the lamp housing 20 other than the rear and lower surfaces thereof, such as the upper surface (or a side surface) of the lamp housing 20, to the lamp chamber S1.

Further, in the above-described embodiment, an example in which a through hole having a rectangular outer shape is used as the through hole 21 formed in the lamp housing 20, and a bracket including a rectangular ring-shaped part 51 is used as the bracket 50. However, the present disclosure is not limited to this example. For example, a through hole having a polygonal shape other than the rectangular shape may be used as the through hole 21 formed in the lamp housing 20, and a bracket including a ring-shaped part having a polygonal shape other than the rectangular shape may be used as the bracket 50. Further, for example, a through hole having a shape other than the polygonal shape (e.g., a circular shape or an elliptic shape) may be used as the through hole 21 formed in the lamp housing 20, and a bracket including a ring-shaped part having a shape other than the polygonal shape (e.g., a circular shape or an elliptic shape) may be used as the bracket 50.

Further, although an example in which a vehicular lamp fitting according to the present disclosure is applied to a rear combination lamp has been described in the above-described embodiment, the present disclosure is not limited to this example. For example, the present disclosure may be applied to a vehicle signal lighting fixture other than the rear combination lamp, and may also be applied to other vehicular lamp fittings such as a vehicle front light (e.g., a headlight). Note that when a vehicular lamp fitting according to the present disclosure is applied to a vehicle front light, a cooling fan is preferably disposed in the lamp chamber S1.

All the numeral values mentioned in the above-described embodiments are merely examples, and numeral values different from them can be uses as appropriate.

The above-described embodiments are merely examples in all the aspects thereof. The present disclosure should not be limited by the descriptions of the above-described embodiments. The present disclosure may be carried out in various other forms without departing from the spirit or main features of the disclosure.

What is claimed is:

1. A vehicular lamp fitting comprising:
   a lamp housing;
   an outer lens attached to the lamp housing and forming a lamp chamber between the outer lens and the lamp housing;
   a lamp unit disposed in the lamp chamber;
   a bracket; and
   a radar unit detachably fixed to the bracket, wherein a through hole connected to the lamp chamber is formed in the lamp housing, the bracket comprises a first part and a second part, the first part being configured to be disposed in the lamp chamber through the through hole, and the second part being configured to close the through hole in a state where the first part is disposed in the lamp chamber, the vehicular lamp fitting further comprises a fixing part configured to detachably fix the bracket to the lamp housing in a state in which the first part is disposed in the lamp chamber and the second part closes the through hole, and the radar unit is disposed in the lamp chamber while being detachably fixed to the first part.

2. The vehicular lamp fitting according to claim 1, wherein the first part extends to a vicinity of the outer lens, and
the radar unit is detachably fixed to a tip of the first part.

3. The vehicular lamp fitting according to claim 1, wherein the through hole is a through hole connecting a rear surface of the lamp housing to the lamp chamber, or a through hole connecting a lower surface of the lamp housing to the lamp chamber.

4. The vehicular lamp fitting according to claim 1, wherein the through hole is a through hole having a polygonal outer shape, and a cross-sectional shape of the bracket is a polygonal shape conforming to that of the through hole.

5. The vehicular lamp fitting according to claim 1, wherein in one of the first part and the lamp housing, a positioning rib configured to abut against the other of the first part and the lamp housing is provided.

6. The vehicular lamp fitting according to claim 1, wherein a vertical wall part surrounding the through hole is formed in the lamp housing.

7. The vehicular lamp fitting according to claim 1, wherein a cut-out part surrounded by side surfaces of a closure part and an extension part is formed in the bracket, and a connector detachably fixed to a radar-unit holding part is disposed in the cut-out part.

8. The vehicular lamp fitting according to claim 7, wherein a through hole through which a cable extending from the connector is drawn to the outside of the lamp chamber is formed in the closure part.

9. A radar structure comprising:

a bracket comprising a first part and a second part, the first part being configured to be disposed in a lamp chamber through a through hole formed in a lamp housing, the lamp chamber being formed by the lamp housing and an outer lens attached to the lamp housing, the second part being configured to close the through hole in a state where the first part is disposed in the lamp chamber, and the bracket being configured to be detachably fixed to the lamp housing in a state in which the first part is disposed in the lamp chamber and the second part closes the through hole; and a radar unit disposed in the lamp chamber while being detachably fixed to the bracket.

* * * * *